US011007871B2

(12) United States Patent
Rossia

(10) Patent No.: US 11,007,871 B2
(45) Date of Patent: May 18, 2021

(54) DRIVELINE OF TWO DRIVING TANDEM AXLES AND VEHICLE COMPRISING SAID DRIVELINE

(71) Applicant: FPT INDUSTRIAL S.P.A., Turin (IT)

(72) Inventor: Giorgio Rossia, Turin (IT)

(73) Assignee: FPT INDUSTRIAL S.P.A., Turin (IT)

(*) Notice: Subject to any disclaimer, the term of this patent is extended or adjusted under 35 U.S.C. 154(b) by 79 days.

(21) Appl. No.: 16/462,822

(22) PCT Filed: Nov. 24, 2017

(86) PCT No.: PCT/IB2017/057393
§ 371 (c)(1),
(2) Date: May 21, 2019

(87) PCT Pub. No.: WO2018/096500
PCT Pub. Date: May 31, 2018

(65) Prior Publication Data
US 2019/0299775 A1 Oct. 3, 2019

(30) Foreign Application Priority Data

Nov. 25, 2016 (IT) .................... 102016000119789

(51) Int. Cl.
*B60K 17/36* (2006.01)
*F16H 48/24* (2006.01)
(Continued)

(52) U.S. Cl.
CPC ............ *B60K 17/36* (2013.01); *F16H 48/24* (2013.01); *B60K 2023/0816* (2013.01); *B62D 61/125* (2013.01)

(58) Field of Classification Search
CPC .................. B60K 17/36; B60K 17/02; B60K 17/16–165; B60K 23/08–0841;
(Continued)

(56) References Cited

U.S. PATENT DOCUMENTS 2,742,684 A * 4/1956 Rising .................... B60K 17/36
475/237
7,291,083 B2 * 11/2007 Almaguer .............. B60K 17/36
180/249
(Continued)

FOREIGN PATENT DOCUMENTS

DE  102006060842 A1   6/2008
DE  102017218089 A1 * 4/2019  ............... B60K 1/00
(Continued)

OTHER PUBLICATIONS

Patent Cooperation Treaty, International Search Report and Written Opinion for International Application No. PCT/IB2017/057393, dated Mar. 2, 2018, 15 pages.

*Primary Examiner* — Ernesto A Suarez
*Assistant Examiner* — James J Taylor, II
(74) *Attorney, Agent, or Firm* — McCracken & Gillen LLC

(57) ABSTRACT

Driveline of two driving tandem axles comprising a first axle and a second axle parallel to the first axle, having opposite ends, each suitable to support at least one wheel, an auxiliary shaft having a first end and a second end opposite the first, wherein said first end is provided with a joint to connect the auxiliary shaft coaxially to a main driveline shaft and wherein said second end is stably connected to said first axle to guide it in rotation, an intermediate shaft having a first end and a second end opposite the first, wherein said second end is stably connected to said second axle to guide it in rotation, a transmission device reversibly connected with said auxiliary shaft to transfer a rotation from said auxiliary shaft to said intermediate shaft, actuation means configured to deactivate said lifter when said actuator controls said connection and to activate said lifter when said actuator activates a (Continued)

disconnection between said transmission device and said auxiliary shaft.

10 Claims, 4 Drawing Sheets

(51) Int. Cl.
*B60K 23/08* (2006.01)
*B62D 61/12* (2006.01)

(58) Field of Classification Search
CPC .......... B60Y 2200/14–1432; B60Y 2400/421; F16H 48/24; B62D 61/12–125
See application file for complete search history.

(56) References Cited

U.S. PATENT DOCUMENTS

| | | | |
|---|---|---|---|
| 9,102,232 B2 * | 8/2015 | Ziech | B60K 17/3462 |
| 9,381,806 B2 * | 7/2016 | Tawala | B60K 17/16 |
| 9,644,726 B2 * | 5/2017 | Cooper | B60K 17/165 |
| 2014/0057752 A1 | 2/2014 | Ziech | |

FOREIGN PATENT DOCUMENTS

| | | | | |
|---|---|---|---|---|
| EP | 2574489 A1 | 4/2013 | | |
| JP | H08337125 A | 12/1996 | | |
| WO | WO-2008113484 A1 * | 9/2008 | ........... | B60K 17/348 |

* cited by examiner

DRIVELINE OF TWO DRIVING TANDEM AXLES AND VEHICLE COMPRISING SAID DRIVELINE

CROSS-REFERENCE TO RELATED APPLICATIONS

The present application claims priority to PCT International Application No. PCT/IB2017/057393 filed on Nov. 24, 2017, which application claims priority to Italian Patent Application No. 102016000119789 filed Nov. 25, 2016, the entirety of the disclosures of which are expressly incorporated herein by reference.

STATEMENT RE: FEDERALLY SPONSORED RESEARCH/DEVELOPMENT

Not applicable.

TECHNICAL FIELD OF THE INVENTION

The invention relates to the field of drivelines of two driving tandem axles and to a vehicle comprising said driveline.

STATE OF THE ART

Tandem axles are those axles that are very close to one another and are arranged in the rear part of the vehicle.

This type of configuration is implemented in vehicles for the transportation of goods and in road tractors.

In some configurations, the rear axle of the tandem can be lifted so as to reduce the friction of the wheels with the ground and, consequently, consumptions, when the load carried by the vehicle is smaller than a predetermined load threshold.

In other configurations, the rear axle of the tandem is a driving axle and, therefore, it is connected to the driveline.

In these cases, generally speaking, the main shaft, connected to the gearbox, is coaxially connected to a first end of a so-called intermediate shaft or inter-shaft by means of a joint. A second end of the intermediate shaft supports a pinion of the bevel gear of the second axle.

On the intermediate shaft there is also mounted and fixed a first gear, which transfers the motion to an auxiliary shaft by means of a second gear, which is mounted and fixed on the auxiliary shaft. An end of said auxiliary shaft supports the pinion in the bevel gear of the first axle of the tandem. An example of this configuration is shown in FIG. 1 of the prior art.

SUMMARY OF THE INVENTION

The object of the invention is to provide a driveline of two driving tandem axles that is improved compared to known solutions.

The idea on which the invention is based is that of having a main driveline shaft, namely the shaft that receives the motion from the engine, which is operatively connected with an auxiliary shaft on which there is fixed the pinion that meshes in the differential of the axle of the tandem.

On said auxiliary shaft there is mounted a motion transmission device, associable with the auxiliary shaft in a rotary manner by means of a dog clutch and sliding on the auxiliary shaft.

An intermediate shaft has a first end, which is suitable to receive the motion from said motion transmission device, and a second end, on which there is fixed the pinion that meshes in the differential of the second axle of the tandem.

By first axle of the tandem, or simply first axle, we mean the axle that is the closest to the engine of the vehicle and, therefore, the one oriented in the driving direction of the vehicle; as a consequence, by second axle of the tandem, or simply second axle, we mean the axle that is the farthest from the engine of the vehicle.

According to the invention, the second axle can be lifted and the clutch that deactivates the device for the transmission of the motion to the intermediate shaft is controlled accordingly upon lifting of the second axle, so that, when the second axle is lifted, it is also disconnected from the driveline.

This configuration leads to many advantages, when the second axle is lifted and, hence, disabled:

The motion is transferred to the first axle without any deflection, namely having the pinion of the differential in axis with the main driveline shaft with a significant reduction of frictions and inertia;

The intermediate shaft is always connected to the second axle, but, when the latter is lifted from the ground, the entire intermediate shaft and also the device for the transmission of the motion to the intermediate shaft are inert relative to the motion condition of the vehicle.

A subject-matter of the invention is a driveline of two driving tandem axles.

A further subject-matter of the invention is a vehicle comprising said driveline.

The appended claims describe preferred variants of the invention and form an integral part of the description.

BRIEF DESCRIPTION OF THE FIGURES

Further objects and advantages of the invention will be best understood upon perusal of the following detailed description of an embodiment thereof (and of relative variants) with reference to the accompanying drawings merely showing non-limiting examples, wherein:

FIG. 3 shows a second preferred variant of the driveline of a tandem configuration according to the invention, whereas

In the figures, the same numbers and the same reference letters indicate the same elements or components.

For the purposes of the invention, the term "second" component does not imply the presence of a "first" component. As a matter of fact, these terms are only used for greater clarity and should not be interpreted in a limiting manner.

DETAILED DESCRIPTION OF EMBODIMENTS

Figure 2:
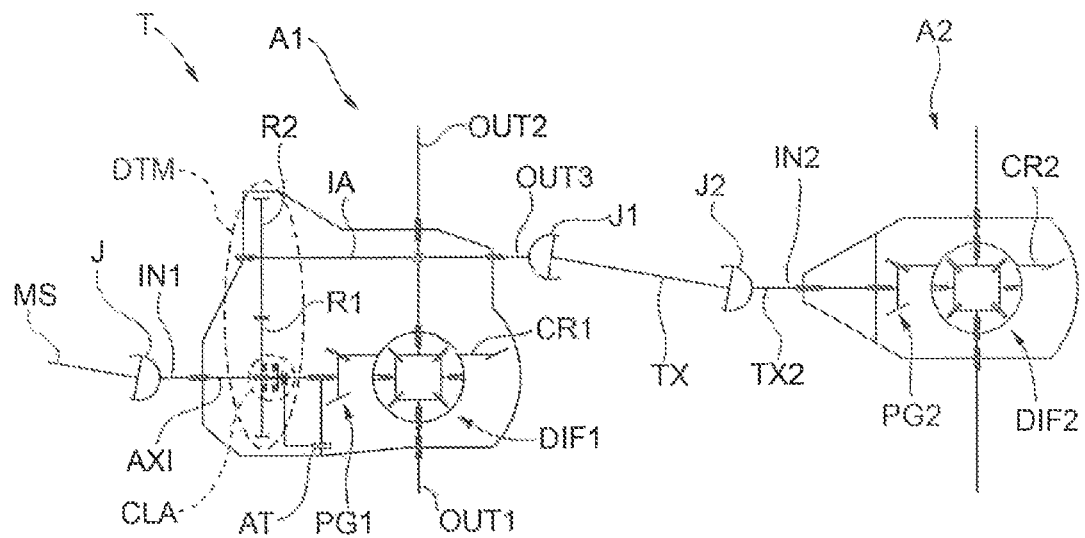
FIG. 2 shows a diagram of a first preferred variant of the driveline of a tandem configuration according to the invention.
Figure 3:
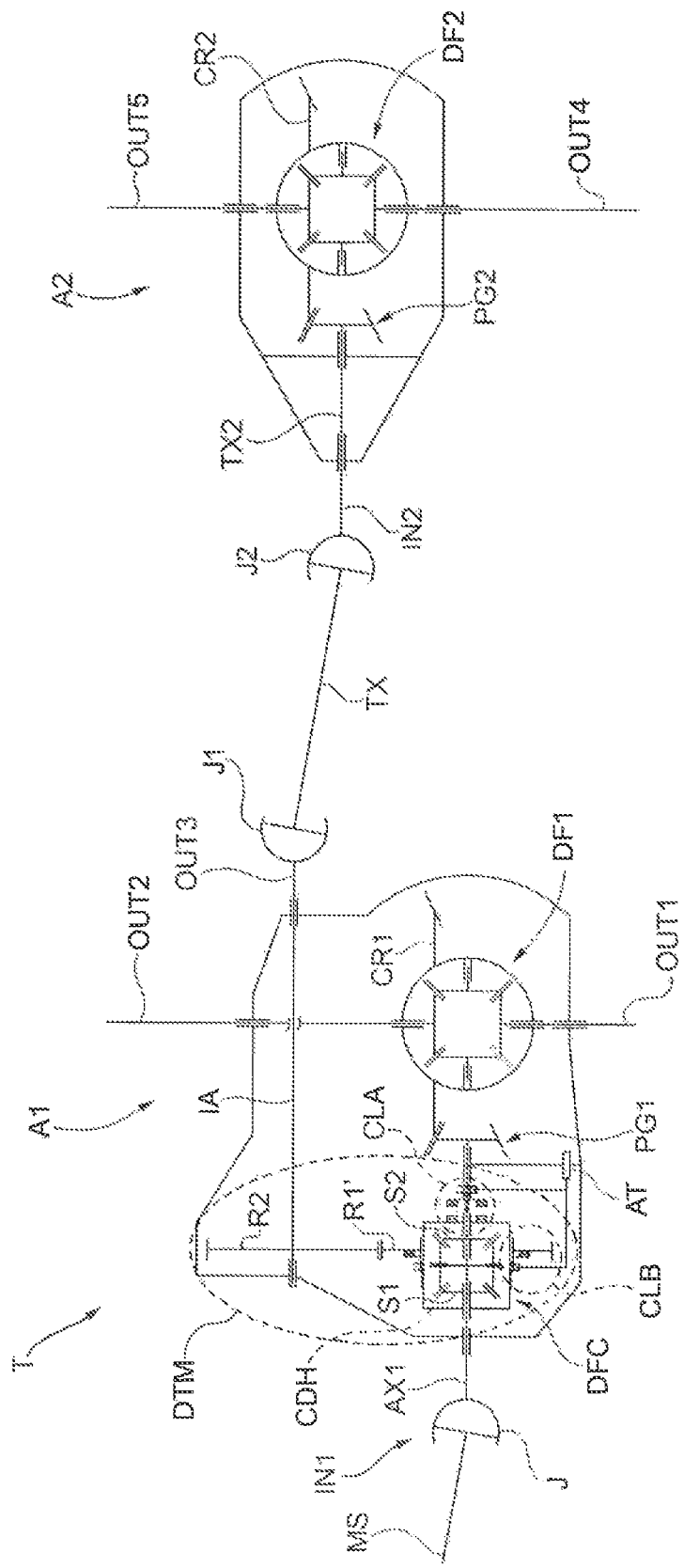

FIGS. 2 and 3 show a driveline T according two respective variants of the invention.

This driveline comprises an input IN and three outputs, two outputs OUT1, OUT2 being suitable to be connected to the axle shafts of the first axle A1 of the tandem and an output OUT3 being designed to transmit the torque to the second axle A2 with the respective outputs OUT 4 and OUT 5 to be connected to the wheels of the second axle.

Both the first and the second axle comprise a respective differential DIF1 and DIF2 with a respective bevel gear CR1 and CR2 to transfer the rotary motion received from the respective pinions PG1 and PG2 to the organs of the differentials in a known manner. Therefore, rings and pinions define the same number of bevel gears.

The input IN and the output OUT3 are parallel to one another, but not coaxial, and they are oriented according to a longitudinal extension of the vehicle, whereas the outputs OUT1 and OUT2 are perpendicular to the input IN1 and to the output OUT3.

Similarly, the second axle has an input shaft TX2 of its own having an accessible end IN2 and the outputs OUT4 and OUT5 perpendicular to the extension of the vehicle and to the direction defined by the input IN2.

The output OUT3 and the input IN2 are interconnected by means of an outer transmission shaft TX, which is connected to the output OUT3 and to the input IN2 by means of the joints J1 and J2.

In particular, IN indicates an accessible end of an auxiliary shaft AX, which is suitable to be connected, by means of a joint J, to the main driveline shaft MS of the vehicle, which, in turn, is driven by the engine E of the vehicle, which can be an internal combustion engine or a hybrid assembly.

Regardless of the optional presence of the joint J, the main shaft MS clearly is directly connected to the auxiliary shaft, since there are no gears or clutches between them. This advantageously allows manufactures to minimize frictions and inertia when the second axle is not operating, as described hereinafter.

At the end opposite the accessible end of the auxiliary shaft AX there is fixed the aforesaid pinion PG1 to transfer the rotation to the differential DIF1 of the first axle A1 in order to distribute the motion between the outputs OUT1 and OUT2 connected to the respective axle shafts.

The auxiliary shaft AX is associated with an intermediate shaft IA, which is parallel to the auxiliary shaft, but not coaxial thereto, by means of a motion transmission device DTM, which can be associated with the auxiliary shaft by means of a dog clutch CLA, which is mounted on the auxiliary shaft and can axially slide on it.

The closing of the dog clutch CLA determines the rotary connection of the auxiliary shaft to the motion transmission device DTM, which, in turn, transmits the motion to the intermediate shaft IA.

Said intermediate shaft IA has an accessible end, which defines the aforesaid third output OUT3.

An actuator AT controls the opening and the closing of the dog clutch CLA.

Figure 4:
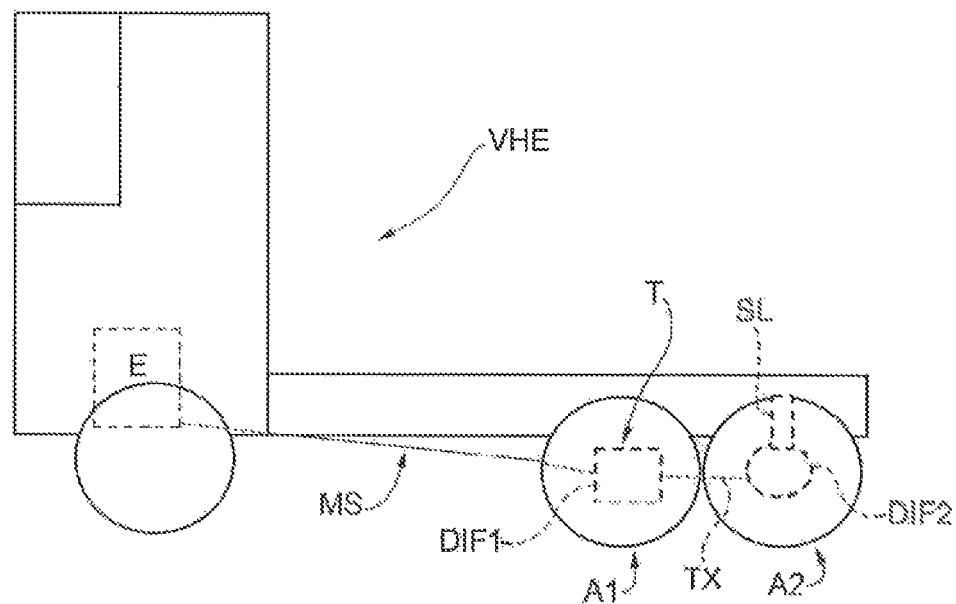
FIGS. 4 and 5 show two operative conditions of a vehicle implementing the driveline according to the invention.
Figure 5:
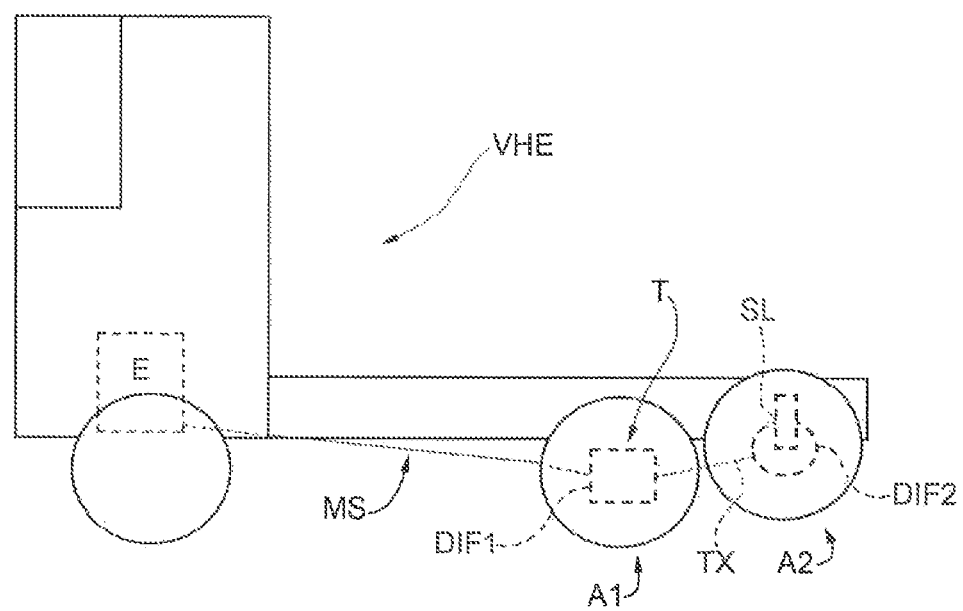

The second axle A2 is associated with a lifting device SL, which allows the second axle A2 to be lifted, distancing the relative wheels from the ground, see the comparison of FIGS. 4 and 5.

According to the invention, the lifting device SL is controlled in parallel with the dog clutch CLA; precisely, when the clutch is open, the second axle is lifted and, therefore, not operative and vice versa, when the clutch is closed, the axle is lowered and, hence, operative.

Therefore, the torque is transferred to the second axle only when it is in operative conditions in which it can actually contribute to the driving of the vehicle.

According to FIG. 2, the transmission device DTM comprises a first gear R1, which is mounted in the auxiliary shaft AX, and a second gear R2, which is fixed on the intermediate shaft IA so that the first gear operatively meshes on the second gear.

The aforesaid dog clutch CLA determines the operative connection of the first gear with the auxiliary shaft AX and, therefore, the transmission of the motion to the differential DIF2 of the second axle A2 by means of the relative bevel gear PG2/CR2.

The difference between the variant shown in FIG. 3 and the first variant shown in FIG. 2 lies in a few details described hereinafter.

Figure 3A:
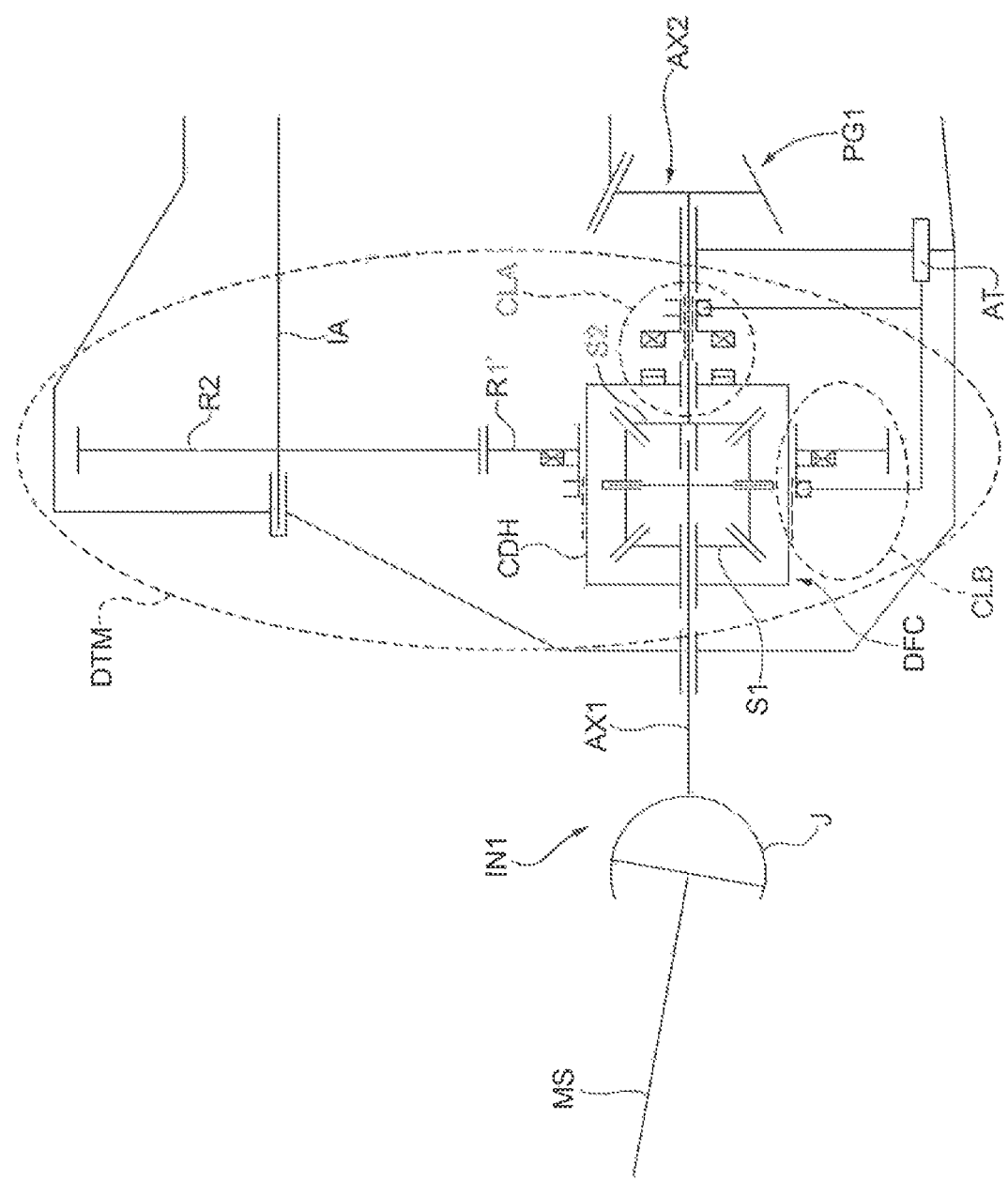
FIG. 3a shows an enlargement of a portion of FIG. 3.

In particular, the transmission device DTM comprises a further differential, which acts as a central differential between the first axle A1 and the second axle A2, as you can better see in the enlargement of FIG. 3a. Hereinafter, with reference to the variant of FIG. 2, the transmission device DTM is called "central differential" DFC. For this variant, the symbols DFC and DTM are interchangeable.

The gear ratio towards the first axle A1 is equal to the gear ratio towards the second axle A2, so that, when the second axle is operative, the two axles rotate at the same rotation speed regardless of the fact that they are indirectly interconnected by the ground.

The auxiliary shaft is divided into two parts AX1 and AX2, which are coaxial to one another. AX1, on one side, is manufactured as one single piece together with the input IN and, on the opposite side, supports the satellite carrier of the central differential. AX2, at one end, is manufactured as one single piece together with the planetary gear S1 and, at the other end, is manufactured as one single piece together with the pinion PG1 of the first bevel gear PG1/CR1.

Another planetary gear S1 opposes, in the central differential, the preceding planetary gear S2 and has a fulcrum that is integral to the casing of the differential and coaxial to the auxiliary shaft (AX1, AX2).

In this case, again, there is a first dog clutch CLA, which makes the box of the central differential CDH integral to the second part AX2 of the auxiliary shaft AX.

Furthermore, the first gear R1' is reversibly connectable in rotation to the box of the central differential by means of a second sliding clutch CLB, preferably a dog clutch, which is mounted on a part of the box of the differential having a cylindrical symmetry and provided with grooves and is suited to engage proper seats of the first gear R1' Like in the first variant, the first gear R1' operatively meshes on the second gear R2, etc.

By reversibly we mean that is can be connected to disconnected in relation to at least one operating mode.

The actuator AT controls the two clutches in an opposite manner, so that, when a clutch is open, the other one is closed and vice versa.

Figure 1:
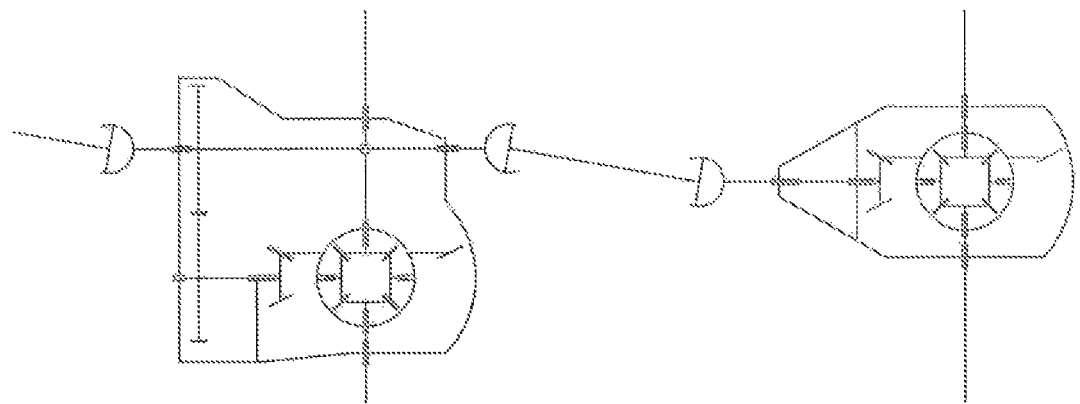
FIG. 1 shows a diagram of a driveline according to the prior art.

Contrary to the variant of FIG. 1, when the first dog clutch is closed CLA (engaged), then the rear axle is lifted and, vice versa, when the first dog clutch is open (disengaged), the rear axle is operative.

According to a first operating mode, when the first dog clutch CLA is active, the second clutch CLB is inactive and, therefore, the first gear R1' is free and, hence, does not transfer the motion to the second gear R2. In these condition, the central differential is locked because the first planetary gear S1 is built as one single piece together with the casing of the differential, whereas the second planetary gear S2, which is manufactured as one single piece together with the second part AX2 of the auxiliary shaft, is caused to be integral to the casing of the differential because of the first clutch CLA, which mutually locks said second part of the auxiliary shaft with the casing of the differential. Hence, the angular speed of the casing of the differential coincides with the angular speed of the first and second part of the auxiliary shaft. In other words, when the first clutch is closed, the two outputs of the central differential are locked relative to one another.

According to a second operating mode, the first clutch is inactive, whereas the second clutch is active. Therefore, the differential has an input coinciding with the first part of the auxiliary shaft AX1 and two outputs represented by the two planetary gears S1 and S2, which, compared to the preceding operating mode, are not rigidly constrained to one another; hence, the planetary gear S2 represents the first output and the casing represents the second output of the central differential.

As you can see in the diagram of FIG. 3, the first gear R1' is directly mounted on the casing of the central differential. This would lead you to think that the latter has a symmetry of rotation around the auxiliary shaft AX1, AX2. This situation is ideal because it minimizes the vibrations caused by the rotation of the casing.

Nevertheless, the casing can have an axial symmetry relative to the auxiliary shaft AX (AX1+AX2), but this symmetry does not necessarily have to be a rotation symmetry, as only one single portion thereof has a rotation symmetry, namely a cylindrical shape.

FIG. 4 shows an example of a vehicle VHE in a condition in which the second axle A2 is lowered and the torque is transferred from the engine E to the main driveline shaft MS to the driveline T, which transmits the motion of the right axle shaft OUT1 and to the left axle shaft OUT2, which define the first axle, and to the intermediate shaft IA, which delivers the motion, through the shaft TX and the joints J1 and J2, to the second axle and, precisely, to the input shaft TX2 of the second axle having a second end opposite the first accessible end IN2, on which there is steadily fixed the second pinion PG2 of the second bevel gear PG2/CR2, whose ring transfers the motion to the second differential DIF2 of the second axle A2.

On the other hand, FIG. 5 shows a condition opposite the one of FIG. 4, in which the same vehicle VHE has the second axle A2 lifted by means of a relative lifting device SL and the torque is transferred from the engine E to the main driveline shaft MS to the driveline T, which transmits the motion only to the first axle A1.

Both variants described above can be subjected to changes; for example, instead of the dog clutches you can use other types of clutches, even though the ones described herein are preferred because of their manufacturing simplicity.

The examples described above can be subjected to variations, without for this reason going beyond the scope of protection of the invention set forth in the appended claims, comprising all equivalent embodiments for a person skilled in the art.

When reading the description above, a skilled person can carry out the subject-matter of the invention without introducing further manufacturing details. The elements and features contained in the different preferred embodiments, drawings included, can be combined with one another, without for this reason going beyond the scope of protection of this patent application. The information contained in the part concerning the state of art only serves the purpose of better understanding the invention and does not represent a declaration of existence of the items described. Furthermore, if not specifically excluded by the detailed description, the information contained in the part concerning the state of art should be considered as an integral part of the invention.

The invention claimed is:

1. A driveline of two driving tandem axles comprising
a first vehicle axle and a second vehicle axle parallel to the first axle, having opposite ends, each suitable to support at least one wheel,
an auxiliary shaft having a first end and a second end opposite the first end, wherein said first end is provided with an input to be guided directly in rotation by a main driveline shaft and wherein said second end is stably associated with said first axle to guide it in rotation,
an intermediate shaft having a first end and a second end opposite the first end, wherein said second end is stably associated with said second axle to guide it in rotation,
a transmission device reversibly connectable with said auxiliary shaft to transfer a rotation from said auxiliary shaft to said intermediate shaft,
actuation means configured to lower said second axle when said transmission device operatively connects said auxiliary shaft with said intermediate shaft and vice versa;
wherein the transmission device includes:
a first gear associated with said auxiliary shaft and
a second gear operatively fixed on said intermediate shaft wherein said second gear meshes operatively on said first gear and
a central differential having an input, a first and a second output,
wherein said auxiliary shaft comprises a first part and a second part separated from each other, wherein said first part is associated with said input of the central differential and said second part is associated with said first output and wherein said first gear is selectively associable with said second output, and wherein said first output and said second output are selectively mutually lockable,
wherein said actuation means comprise a first clutch suitable to mutually lock said first and second output and a second clutch suitable to selectively associate said second output with said first gear, and
wherein said actuation means are configured so that when said second clutch is open, then said first clutch is closed and a lifter is activated, and vice versa.

2. The driveline according to claim 1, wherein said actuation means comprises the second clutch suitable to reversibly control an operative interconnection between said auxiliary shaft and said intermediate shaft by means of said transmission device and an actuator operatively associated with said second clutch.

3. The driveline according to claim 1, wherein said actuation means comprises the lifter of pneumatic type that is suitable to lift said second axle distancing it from the ground.

4. The driveline according to claim 1, wherein said second end of the auxiliary shaft is stably associated with said first axle through a first bevel gear and/or wherein said second end of the intermediate shaft is stably associated with said second axle through a second bevel gear.

5. The driveline according to claim 1, wherein a first bevel gear comprises a pinion stably associated with said second end of the auxiliary shaft and a ring stably associated with a differential of said first axle.

6. The driveline according to claim 1, wherein said transmission device comprises the first gear mounted on said auxiliary shaft and the second gear operatively fixed on said intermediate shaft, wherein said second gear meshes on said first gear and wherein the second clutch operatively connects said auxiliary shaft with said first gear.

7. The driveline according to claim 6, wherein said second clutch is of front type, mounted on said auxiliary shaft and sliding axially thereon and selectively couplable in said first gear by said actuation means.

8. The driveline according to claim 1, wherein said central differential comprises a casing defining said second output, a first planetary gear having a fulcrum integral with said casing and coaxial with said auxiliary shaft, a second planetary gear, parallel to the first planetary gear, defining said first output, a satellite carrier having a fulcrum coincident with said first part of the auxiliary shaft, defining said input and at least one satellite that meshes in said first and second planetary gear.

9. The driveline according to claim 8, wherein said first clutch is a dog clutch type and sliding axially on said second part of said auxiliary shaft and suitable to make said second part of the auxiliary shaft reversibly integral in rotation with said casing and/or wherein said second clutch is of front type and sliding axially on a part of the casing with cylindrical symmetry coaxial with said auxiliary shaft and suitable to make said casing reversibly integral in rotation with said first gear.

10. An industrial vehicle comprising the first and the second rear axle configured in tandem, an engine, the main driveline shaft connected to an output of said engine and the driveline according to claim 1, having the input operatively connected with said main driveline shaft and the lifter to lift said second axle.

\* \* \* \* \*